United States Patent
Xi

(10) Patent No.: US 7,151,361 B2
(45) Date of Patent: Dec. 19, 2006

(54) CURRENT SENSING CIRCUITRY FOR DC-DC CONVERTERS

(75) Inventor: Xiaoyu Xi, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 88 days.

(21) Appl. No.: 10/984,283

(22) Filed: Nov. 9, 2004

(65) Prior Publication Data

US 2006/0097710 A1    May 11, 2006

(51) Int. Cl.
  *G05F 1/10*   (2006.01)
  *G05F 1/40*   (2006.01)
(52) U.S. Cl. .................. 323/222; 323/282; 323/288
(58) Field of Classification Search ............. 323/222, 323/282, 283, 288
  See application file for complete search history.

(56) References Cited

U.S. PATENT DOCUMENTS

| | | | |
|---|---|---|---|
| 5,420,777 A | 5/1995 | Muto | |
| 5,731,731 A | 3/1998 | Wilcox et al. | |
| 5,867,379 A * | 2/1999 | Maksimovic et al. | 363/89 |
| 5,909,108 A * | 6/1999 | He et al. | 323/225 |
| 6,246,221 B1 | 6/2001 | Xi | |
| 6,377,034 B1 | 4/2002 | Ivanov | |
| 6,933,706 B1 * | 8/2005 | Shih | 323/222 |

\* cited by examiner

*Primary Examiner*—Shawn Riley
(74) *Attorney, Agent, or Firm*—Ronald O. Neerings; W. James Brady, III; Frederick J. Telecky, Jr.

(57) ABSTRACT

An inductor based DC-DC converter of the present invention employs two power switches such that only a fraction of inductor current flows through sensing circuitry. The sensing circuitry itself is comprised of sense transistors instead of resistors in order to further reduce power dissipation and temperature variations. The sensing circuitry includes a differential power supply that modifies a sense current employed as feedback to one of its inputs. The sense transistors are selected and configured such that the sense current is a relatively constant fraction of the inductor current of the converter.

23 Claims, 9 Drawing Sheets

CURRENT SENSING CIRCUITRY FOR DC-DC CONVERTERS

FIELD OF THE INVENTION

The present invention relates generally to power conversion, and more particularly, to systems and methods for sensing inductor current in current mode DC-DC converters.

BACKGROUND OF THE INVENTION

DC-DC converters are widely employed in devices of today to perform power conversion. Generally, DC-DC converters receive a nominal voltage from a power source, such as a battery, and provide a regulated output voltage at one or more voltage levels. Some important operational characteristics of DC-DC converters include efficiency, response, load regulation, voltage regulation, and the like. A variety of converters and topologies can be employed to perform this power conversion. For example, buck converters, boost converters, and buck boost converters are three basic types of power supply converter technologies.

Another type of converter that is widely used in electronic devices, particularly portable electronic devices, is a current mode DC-DC converter, which has relatively high efficiency and increases battery charging cycles. The current mode DC-DC converter employs an LC output filter that operates as a loose tolerance, voltage controlled current source. For this type of converter, inductor current is utilized as feedback to generate a voltage ramp that is fed to a pulse width modulation (PWM) controller. From this feedback, the PWM controller more precisely regulates the output voltage.

One problem of current mode DC-DC converters is that they are not as efficient as desired. Portable devices of today demand and require a highly efficient converter in order to reduce power consumption and improve battery life. Improvements in output voltage control are also desirable. Accordingly, a current mode DC-DC converter that has improved power efficiency and/or output voltage control is desired.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention facilitates DC-DC power conversion by providing systems and methods for power converters that controllably provide selected output voltages while mitigating power loss and being relatively less sensitive to temperature changes than conventional DC-DC power converters. The power loss is mitigated by employing sense transistor devices, also referred to as sense switches, in place of sense resistors and by reducing the amount of current flowing through the transistor devices. Furthermore, the sense transistor devices are more resistant to current and/or resistance fluctuations as a result of temperature changes than conventional sense resistors.

An inductor based DC-DC converter of the present invention employs two power switches such that only a fraction of inductor current flows through sensing circuitry. The sensing circuitry itself is comprised of sense transistors instead of resistors in order to further reduce power dissipation and temperature variations. The sensing circuitry includes a differential power supply that modifies a sense current employed as feedback to one of its inputs. The sense transistors are selected and configured such that the sense current is a relatively constant fraction of the converter inductor current.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described with respect to the accompanying drawings in which like numbered elements represent like parts. The figures provided herewith and the accompanying description of the figures are merely provided for illustrative purposes. One of ordinary skill in the art should realize, based on the instant description, other implementations and methods for fabricating the devices and structures illustrated in the figures and in the following description.

The present invention facilitates DC-DC power conversion by providing systems and methods for power converters that controllably provide selected output voltages while mitigating power loss and being relatively less sensitive to temperature changes than conventional DC-DC power converters. The power loss is mitigated by employing sense transistor devices, also referred to as sense switches, in place of sense resistors and by reducing the amount of current flowing through the sense transistor devices. Furthermore, the sense transistor devices are more resistant to current and/or resistance fluctuations as a result of temperature changes than conventional sense resistors, which permits greater control of output power and voltage.

An inductor based DC-DC converter of the present invention employs power switches such that only a fraction of inductor current flows through sensing circuitry. The sensing circuitry is comprised of sense transistors instead of resistors in order to further reduce power dissipation and temperature variations. The sensing circuitry includes a differential power supply that modifies a sense current employed as feedback to one of its inputs. The sense transistors are selected and configured such that the sense current is a relatively constant fraction of the converter inductor current.

Figure 1:
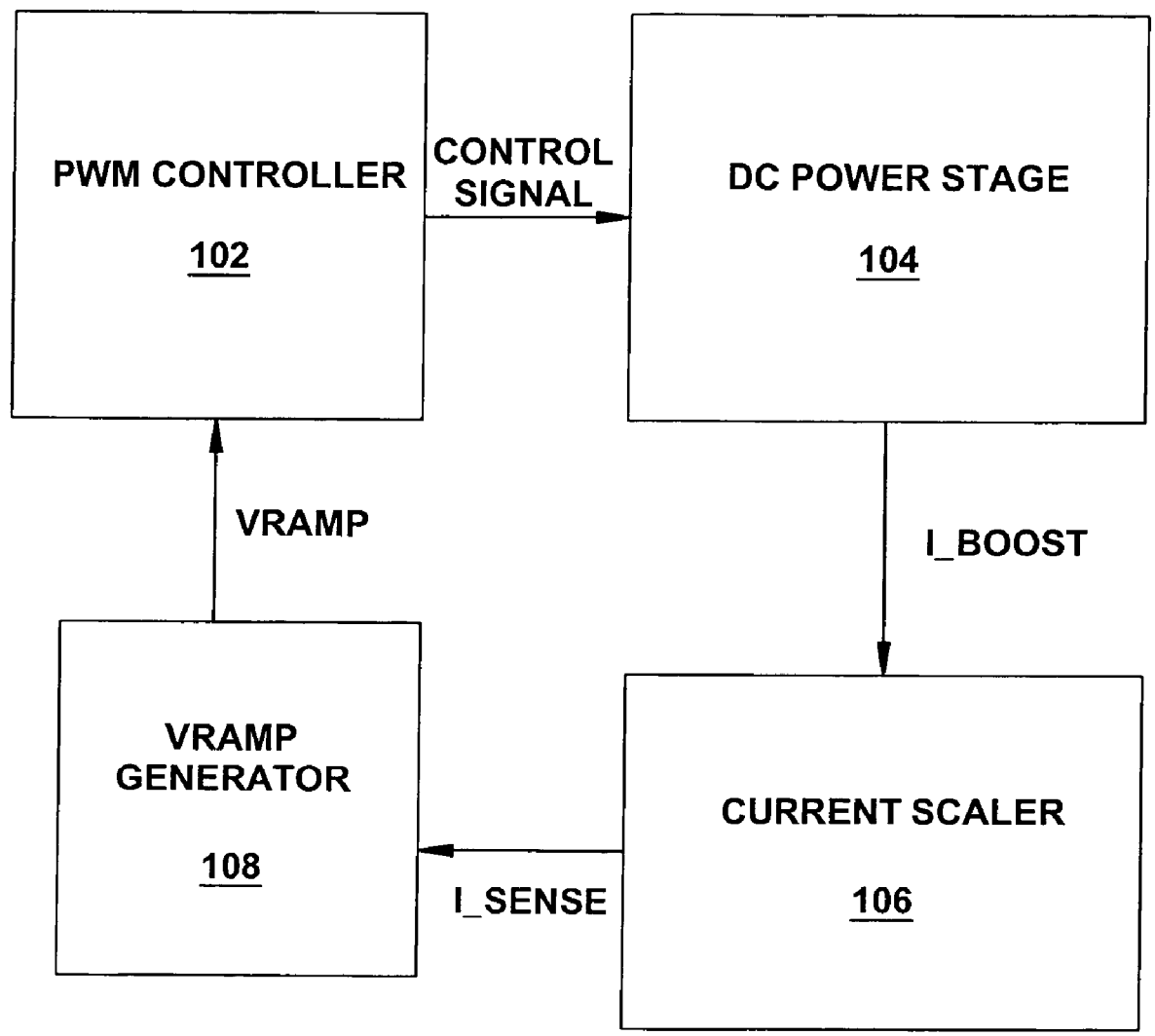
FIG. 1 is a block diagram illustrating a current mode DC-DC converter in accordance with an aspect of the present invention.

FIG. 1 is a block diagram illustrating a current mode DC-DC converter in accordance with an aspect of the present invention. The converter includes a pulse width modulation (PWM) controller 102, an inductor based power stage 104, a current scaler 106, and a voltage ramp generator 108.

The PWM controller 102 generates a control signal having a selected duty cycle and, therefore, a desired output voltage range for the converter, in response to a received voltage ramp signal (VRAMP). The control signal is received by the power stage 104, which controllably generates and provides an output voltage and current to a load (not shown).

As stated above, the power stage 104 is inductor based and has an inductor current (I_BOOST) associated therewith that varies according to the load's power consumption, desired output voltage, and operation of the power stage 104. The inductor current is received by a current scaler 106 that reduces power loss by sensing a portion of the inductor current and generating a sense current (I_SENSE) that is proportional to the inductor current. The current scaler 106 employs a number of sense switches/transistors and feedback in order to generate the sense current instead of the conventional approach of utilizing sense resistor(s). The voltage ramp generator 108 receives the sense current and generates the voltage ramp signal (VRAMP) according to the received sense current.

Generally, the PWM controller 102 compares the VRAMP signal to a threshold value in order to modify a duty cycle for the power stage 104. In one example of the present invention, if the VRAMP signal rises above a threshold voltage, indicating that output voltage has reached a peak level, the PWM controller turns ON one or more power switches within the power stage 104 thereby reducing the output voltage.

Figure 2:
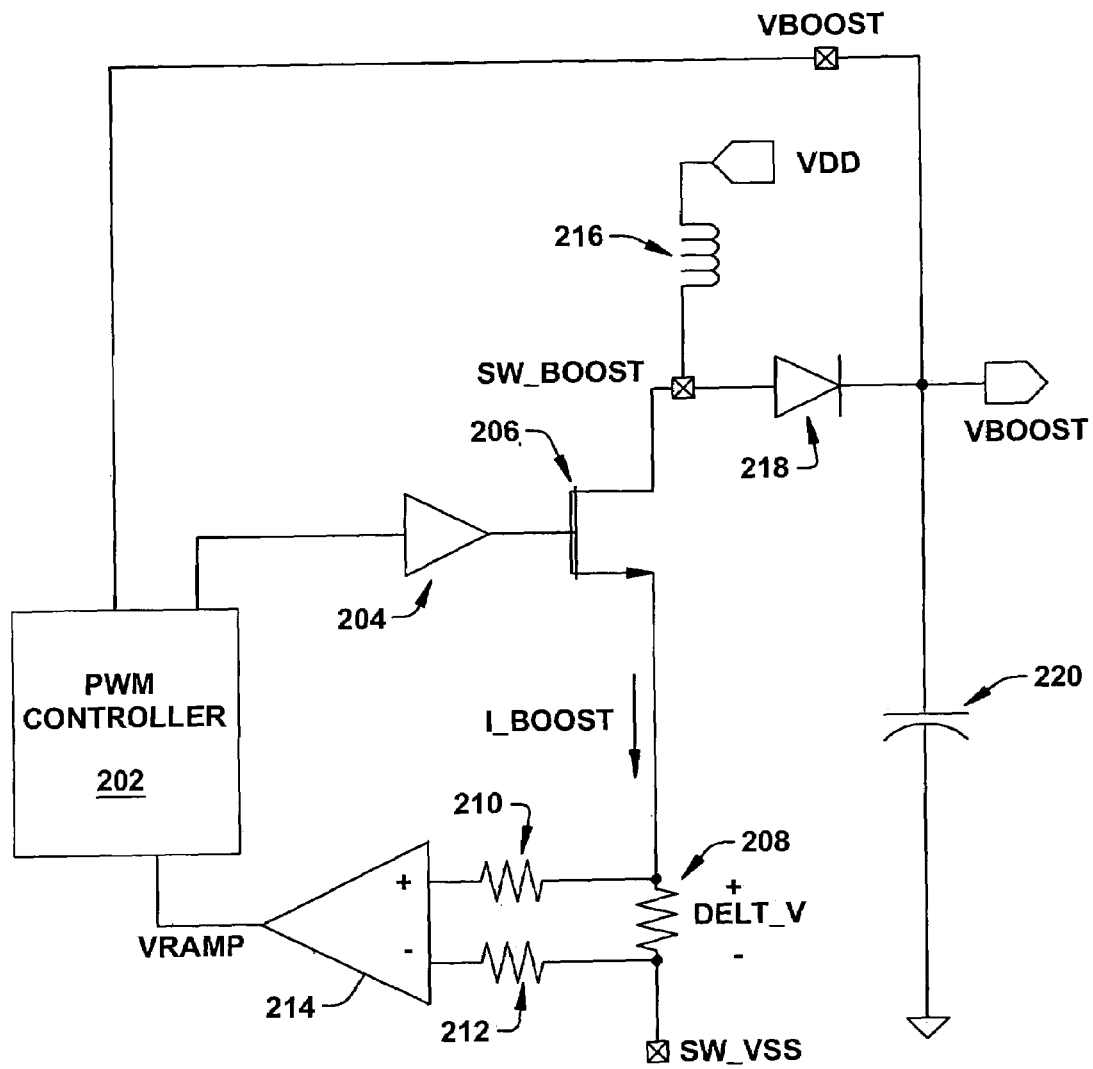
FIG. 2 is a schematic diagram illustrating a conventional current mode boost DC-DC converter.

FIG. 2 is a schematic diagram illustrating a conventional current mode boost DC-DC converter. This type of converter employs an LC output filter that operates as a loose tolerance, voltage controlled current source. For this type of converter, inductor current (I_BOOST) generates a voltage drop across a sense resistor. The voltage drop is then employed to generate a voltage ramp that is fed to a pulse width modulation (PWM) controller, which operates at a fixed frequency and varied duty cycle to permit the converter to provide a controlled output voltage by regulating the inductor current.

The converter includes a PWM controller 202, a driver 204, a power switch 206, a first resistor 208, a second resistor 210, a third resistor 212, an amplifier 214, an inductor 216, a diode 218, and a filter capacitor 220. The first resistor 208, the second resistor 210, and the third resistor 212 are also referred to as sense resistors. A control output of the PWM controller 202 is connected to an input terminal of the driver 204. An output terminal of the driver 204 is connected to a gate of the power switch 206. A drain of the power switch 206 is connected to a switching boost (SW_BOOST) node. A source of the power switch is connected to a first terminal of the first resistor 208 that is also connected to a first terminal of the second resistor 210. A second terminal of the first resistor 208 is connected to a switching VSS (SW_VSS) node, which is also connected to a first terminal of the third resistor 212. A second terminal of the second resistor 210 is connected to a positive input of the amplifier 214 and a second terminal of the third resistor 212 is connected to a negative input of the amplifier 214. An output of the amplifier 214 is connected to a voltage ramp input of the PWM controller 202.

A first terminal of the inductor 216 is connected to a VDD voltage source and a second terminal of the inductor 216 is connected to the switching boost (SW_BOOST) node. A drain of the power switch 206 and a first terminal of the diode 218 are also connected to the SW_BOOST node. A second terminal of the diode 218 is connected to an output node (VBOOST) that provides an output voltage and current to the load. The second terminal of the diode 218 is also connected to a positive terminal of the filter capacitor 220 and a negative terminal of the filter capacitor 220 is connected to ground.

During normal operation, the PWM controller 202 controls the driver 204, which in turn regulates operation of the power switch 206. Inductor current flows through the inductor 216 and a portion of that (I_BOOST) controllably flows through the power switch 206 according to the voltage applied at the gate of the power switch. Another portion of the inductor current can flow through the diode 218 during portions of the power cycle. The filter capacitor 220 can remove AC components from the VBOOST voltage.

The first resistor 208, also referred to as a sense resistor, is selected to have a relatively small resistance value (e.g., 0.1 ohm). The first resistor 208 is in series with the power switch 206 and, as a result, also has the I_BOOST current flowing through it. A voltage drop (DELT_V) then occurs across the first resistor that is equal to the resistance value times I_BOOST. The DELT_V voltage is then applied to the positive and negative inputs of the amplifier 214, which in turn generates the VRAMP signal as a consequence. The PWM controller 202 then receives the VRAMP signal and adjusts its control of the driver 204 accordingly.

The inventor of the present invention appreciates that there are problems with the converter of FIG. 2. One problem is that there is efficiency loss due to the first resistor or sense resistor 208, which effectively increases the on resistance of the power switch. Another problem is that variation of the resistance of the first resistor can introduce error to the sensed voltage DELT_V for a given inductor current. This error can substantially shift a current limit threshold if the current limit is based on monitoring the DELT_V voltage. Generally, in integrated circuits, the first resistor 208 is fabricated with metal materials, which typically have about a 10% process variation and a temperature coefficient greater than about 4000 ppm. The combined effect can cause the resistance of the first resistor 208 to change more than 100% from its lowest value to its highest value. Furthermore, fabrication of the metal resistor on an integrated circuit consumes a relatively large area of space compared to transistor devices.

Figure 3:
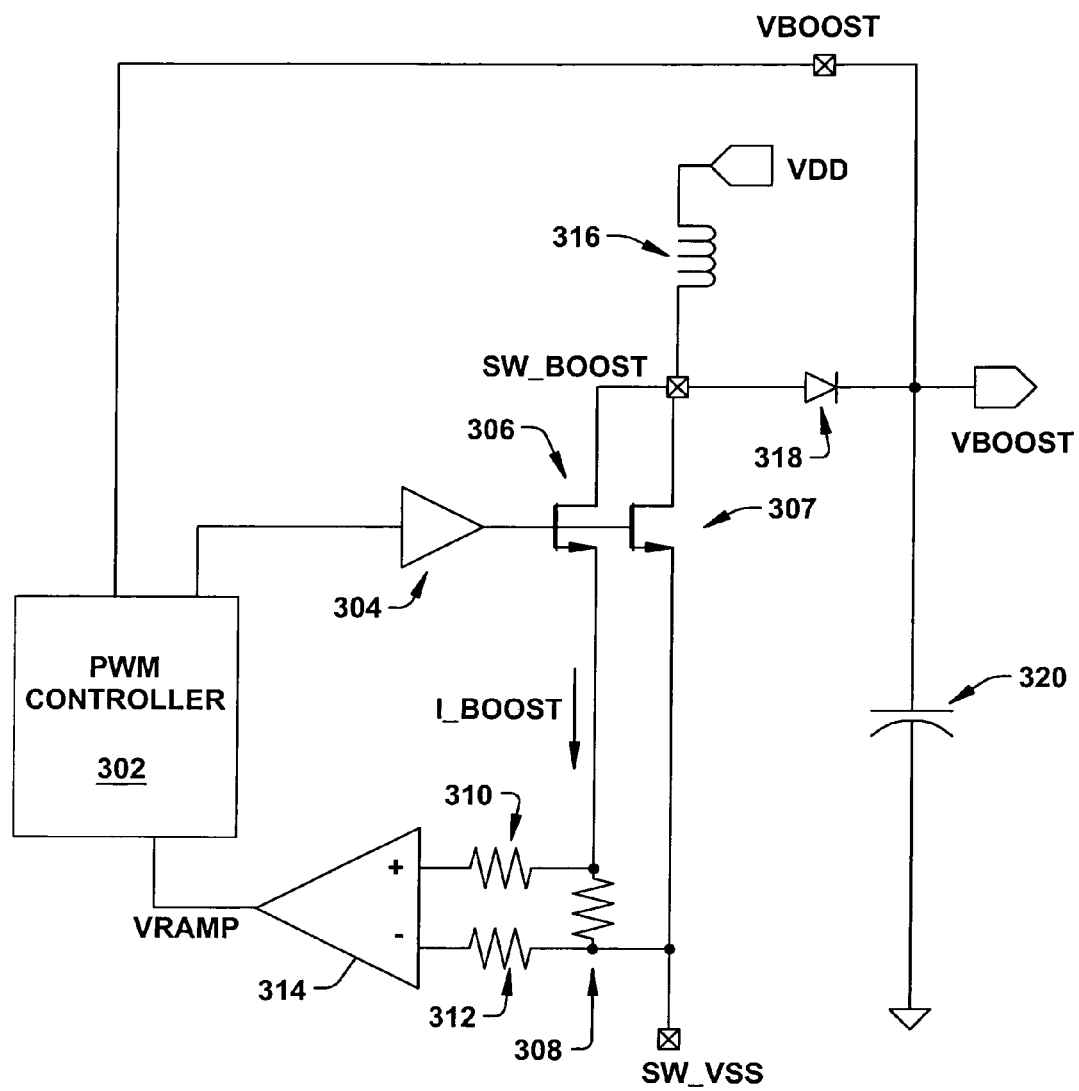
FIG. 3 is a schematic diagram illustrating another conventional current mode boost DC-DC converter.

FIG. 3 is a schematic diagram illustrating another conventional current mode boost DC-DC converter. This type of converter employs an LC output filter that operates as a loose tolerance, voltage controlled current source. For this type of converter, inductor current is again employed to generate a voltage ramp that is fed to a pulse width modulation (PWM) controller, which operates at a fixed frequency and varied duty cycle to permit the converter to provide a controlled output voltage. The converter of FIG. 3 is different from the converter of FIG. 2 in that it employs an extra power switch.

The converter includes a PWM controller 302, a driver 304, a first power switch 306, a second power switch 307, a first resistor 308, a second resistor 310, a third resistor 312, an amplifier 314, an inductor 316, a diode 318, and a filter capacitor 320. A control output of the PWM controller 302 is connected to an input terminal of the driver 304. An output terminal of the driver 304 is connected to a gate of the first power switch 306 and a gate of the second power switch 307. A drain of the first power switch 306 and a drain of the second power switch 307 are connected to a switching boost (SW_BOOST) node. A source of the first power switch 306 is connected to a first terminal of the first resistor 308 that is also connected to a first terminal of the second resistor 310. A second terminal of the first resistor 308 and a source of the second power switch 307 are connected to a switching VSS node (SW_VSS), which is also connected to a first terminal of the third resistor 312. A second terminal of the second resistor 310 is connected to a positive input of the amplifier 314 and a second terminal of the third resistor 312 is connected to a negative input of the amplifier 314. An output of the amplifier 314 is connected to a voltage ramp input of the PWM controller.

A first terminal of the inductor 316 is connected to a VDD voltage source and a second terminal of the inductor 316 is connected to a switching boost (SW_BOOST) node. A drain of the power switch 306 and a first terminal of the diode 318 are also connected to the SW_BOOST node. A second terminal of the diode 318 is connected to an output node (VBOOST) that provides an output voltage and current to the load. The second terminal of the diode 318 is also connected to a positive terminal of the filter capacitor 320 and a negative terminal of the filter capacitor 320 is connected to ground.

During normal operation, the PWM controller 302 controls the driver 304, which in turn regulates operation of the first power switch 306 and the second power switch 307. Inductor current flows through the inductor and a portion of that (I_BOOST) controllably flows through the first power switch 306 according to the voltage applied at the gate of the first power switch 306 and the sizes of the first power switch 306, the second power switch 307, and the first resistor 308, respectively. The I_BOOST current is relatively small, compared to that in FIG. 2, because a substantial portion of the inductor current flows through the second power switch 307. Another portion of the inductor current can flow through the diode 318 during portions of the power cycle. The filter capacitor 320 can remove AC components from the VBOOST voltage.

The first resistor 308, also referred to as a sense resistor, is selected to have a relatively small resistance value (e.g., 0.1 ohm). The first resistor 308 is in series with the first power switch 306 and, as a result, also has the I_BOOST current flowing through it. A voltage drop (DELT_V) then occurs across the first resistor that is equal to the resistance value times I_BOOST. The DELT_V voltage is then applied to the positive and negative inputs of the amplifier 314, which in turn generates the VRAMP signal as a consequence. The PWM controller 302 then receives the VRAMP signal and adjusts its control of the driver 304 accordingly.

The voltage drop across the second power switch 307 is equal to the voltage drop across the first power switch 306 and the DELT_V voltage. However, the first power switch 306 is sized to be significantly smaller than the second power switch 307. As a result, during normal operation and with an appropriately sized first power switch 306, the voltage drop across the second switch 307 is approximately equal to the DELT_V voltage across the first resistor 308. The first power switch 306 applies the voltage drop to the first resistor 308.

The approach of prior art FIG. 3 does mitigate some of the power loss associated with the converter of prior art FIG. 2. However, the inventor of the present invention appreciates that there are problems with this converter. One problem encountered, as with the converter of FIG. 2, is that variation of the resistance of the first resistor can introduce error to the sensed voltage DELT_V for a given inductor current. This error can substantially shift a current limit threshold if the current limit is based on monitoring the DELT_V voltage. Furthermore, for integrated circuits, the first resistor is typically fabricated with metal materials, which generally have about a 10% process variation and a temperature coefficient greater than about 4000 ppm. The combined effect can cause resistance of the first resistor 308 to change more than 100% from its lowest value to its highest value. Fabrication of the metal resistor on an integrated circuit consumes a relatively large area of space compared to transistor devices. Additionally, the DELT_V voltage is also dependent on the voltage drop across the second power switch 307, which is a function of the resistance of the second power switch 307. However, the resistance across the second power switch 307 is typically even greater than that of the first resistor 308. For example, the resistance across the second power switch 307 can vary by as much as 500% from its lowest to highest value.

Figure 4A:
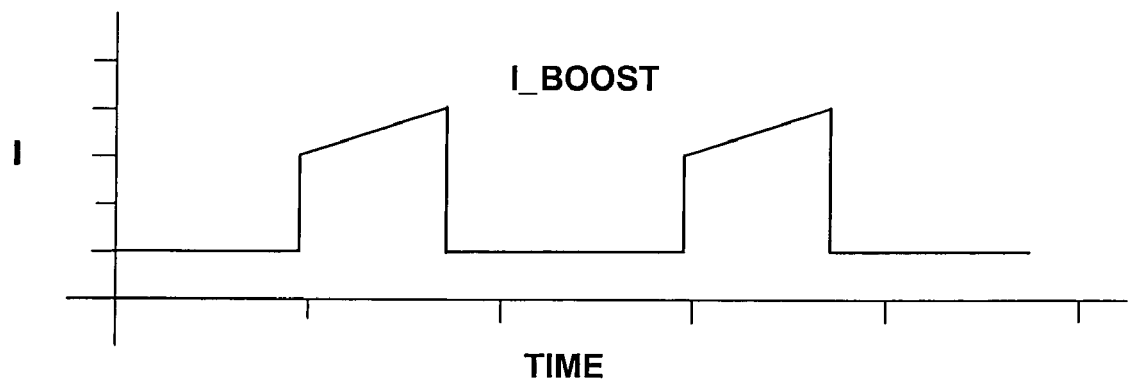
FIGS. 4A and 4B illustrate examples of the VRAMP voltage and I_BOOST current for the conventional converters of FIGS. 2 and 3.
Figure 4B:
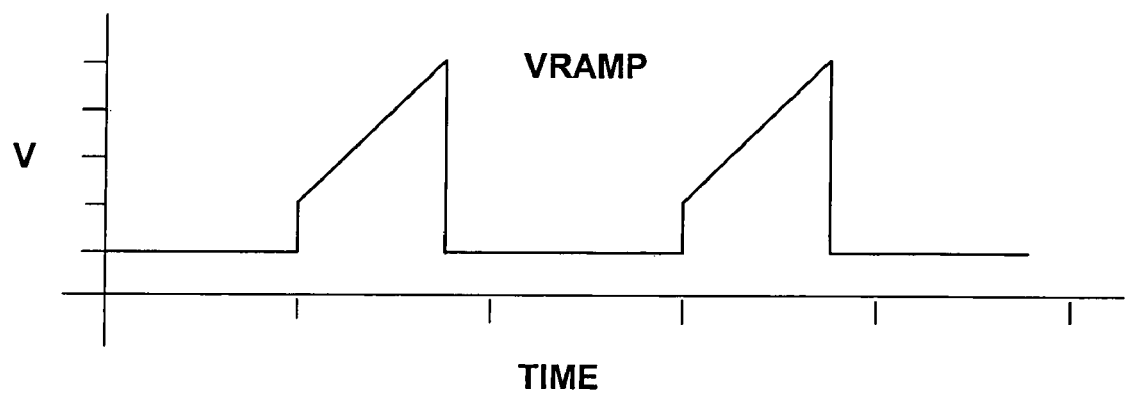

FIGS. 4A and 4B illustrate examples of the VRAMP voltage and I_BOOST current for the conventional converters of FIGS. 2 and 3. FIG. 4A depicts I_BOOST over time and FIG. 4B depicts VRAMP over time. It can be seen that VRAMP is functionally related to I_BOOST. When the power switch(es) are off, I_BOOST drops to about zero as does the DELT_V voltage. Accordingly, the VRAMP drops to about zero. When the power switch(es) are ON, I_BOOST gradually increases, which results in the DELT_V voltage increasing and, correspondingly, increases VRAMP.

Figure 5:
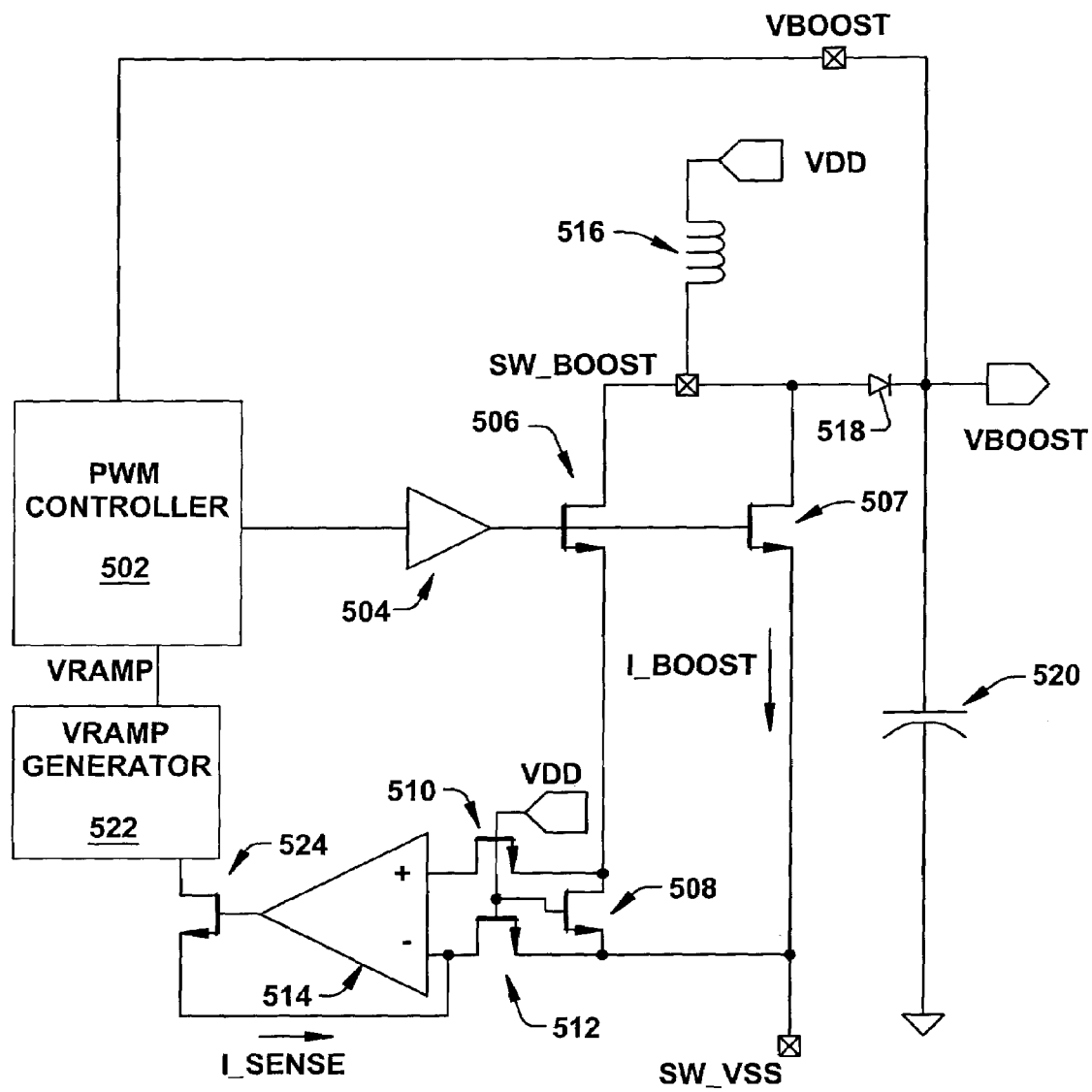
FIG. 5 is a diagram illustrating a current mode boost DC-DC converter in accordance with an aspect of the present invention.

FIG. 5 is a diagram illustrating a current mode boost DC-DC converter in accordance with an aspect of the present invention. The converter mitigates power consumption and facilitates power output control and employs an LC output filter that operates as a loose tolerance, voltage controlled current source. A sense current is obtained from the inductor current and is then employed to generate a voltage ramp that is fed to a pulse width modulation (PWM) controller. The PWM controller operates at a fixed frequency and varied duty cycle to permit the converter to provide a controlled output voltage.

The converter includes a PWM controller 502, a driver 504, a first power switch 506, a second power switch 507, a first sense switch 508, a second sense switch 510, a third sense switch 512, a fourth sense switch 524, an amplifier 514, an inductor 516, a diode 518, a filter capacitor 520, and a voltage ramp generator component 522. A control output of the PWM controller 502 is connected to an input terminal of the driver 504. An output terminal of the driver 504 is connected to a gate of the first power switch 506 and a gate of the second power switch 507. A drain of the first power switch 506 and a drain of the second power switch 507 are connected to a switching boost (SW_BOOST) node. A source of the first power switch 506 is connected to a first terminal of the first sense switch 508, which is also connected to a first terminal of the second sense switch 510. A second terminal of the first sense switch 508 and a source of the second power switch 507 are connected to a switching VSS (SW_VSS) node, which is also connected to a first terminal of the third sense switch 512. The SW_VSS node is at a lower potential than VDD and can be at ground in some aspects of the invention. A second terminal of the second switch 510 is connected to a positive input of the amplifier 514 and a second terminal of the third resistor 512 is connected to a negative input of the amplifier 514. An output of the amplifier 514 is connected to a gate of the fourth sense switch 524. A source of the fourth sense switch 524 is connected to the voltage ramp generator 522, which generates a voltage ramp (VRAMP) signal. The fourth sense switch 524 generates an I_SENSE current according to a differential signal from the amplifier. The second terminal of the third switch 512 receives this I_SENSE current from the fourth sense switch 524. The PWM controller 502 receives the VRAMP voltage from the voltage ramp generator 522.

A first terminal of the inductor 516 is connected to a VDD voltage source and a second terminal of the inductor 516 is connected to a switching boost (SW_BOOST) node. A drain of the power switch 506 and a first terminal of the diode 518 are also connected to the SW_BOOST node. A second terminal of the diode 518 is connected to an output node (VBOOST) that provides an output voltage and current to the load. The second terminal of the diode 518 is also connected to a positive terminal of the filter capacitor 520 and a negative terminal of the filter capacitor 520 is connected to ground.

During normal operation, the PWM controller 502 controls the driver 504, which in turn regulates operation of the first power switch 506 and the second power switch 507. The PWM controller 502 causes the power switches 506 and 507 to be turned ON for a percentage of a cycle, also referred to as the duty cycle. The duty cycle can vary as a result of the VRAMP voltage or signal that is fed back to the PWM controller. The PWM controller 502 determines whether or not the inductor current should be turned ON or OFF, for example, by comparing the VRAMP signal to a threshold value. The controller 502 accomplishes this by controlling the power switched 506 and 507.

Inductor current flows through the inductor and a substantial portion of that (I_BOOST) controllably flows through the second power switch 507 according to the voltage applied at the gate of the first power switch 506 and the sizes of the first power switch 506, the second power switch 507, and the first sense switch 508. Current flowing through the first power switch 506 is relatively small because a substantial portion of the inductor current flows through the second power switch 507. Another portion of the inductor current can flow through the diode 518 during portions of the power cycle. The filter capacitor 520 can remove AC components from the VBOOST voltage.

The first, second, and third sense switches 508, 510, and 512 are permanently turned on by connecting their gates to VDD as illustrated, which also supplies power to the inductor 516. When the first and second power switches 506 and 507 are ON, a portion of the inductor current generates a voltage drop Vds across the second power switch 507. By sizing the first power switch 506 to be sufficiently larger than the first sense switch 508, the voltage drop Vds is substantially across the first sense switch 508. Because of its size, there will be a relatively small voltage drop across the first power switch 506. As a result, the voltage drop across the first sense switch 508, referred to as DELT_V, is approximately equal to the voltage drop Vds across the second power switch 507.

The differential amplifier 514 causes the fourth sense switch 524 to generate and/or vary the I_SENSE current to return as feedback to the third sense switch 512. The I_SENSE current fluctuates so as to provide a voltage drop across the third sense switch 512 about equal to the DELT_V voltage because the differential amplifier 514 tends towards having the same voltage at both its positive and negative inputs. It is noted that current flowing through the first power switch 506 would be substantially equal to I_SENSE if the first sense switch 508 is the same size as the third sense switch 512. Otherwise, I_SENSE is proportional to the current flowing through the first switch. The I_SENSE current is, essentially, a scaled version of the current flowing through the second power switch 507, referred to as I_BOOST. This scaling of I_BOOST and I_SENSE is a function of the size of the first power switch 506, the second power switch 507, the first sense switch 508, and the third sense switch 512.

As an example of this functional relationship, assume that the third sense switch 512 is of unit size and the first sense switch 508 is K times unit size. The first power switch is M times the unit size and the second power switch is N times unit size. If the resistance across the third sense switch 512 is R, then the resistance across the third first switch 508 is R/K, the first power switch 506 is R/M, and the second power switch 507 is R/N. The voltage across the third sense switch 512, DELT_V, is equal to current through the third sense switch 508 (I_SENSE) times the resistance R. From above, the voltage across the first sense switch 508 is also approximately DELT_V, which is equal to I_SENSE times R times K. The voltage drop across the second power switch 507, Vds, is I_BOOST times R/N, which equals the voltage drop across the first power switch 506 and the voltage drop across the first sense switch 508. The voltage drop across the first power switch 506 is equal to I_SENSE times K (the current flowing through the first power switch 506 and the first sense switch 508) times R/M. As a result, we obtain the following equation for Vds.

$$Vds = I\_BOOST * R/N \qquad (1)$$

$$Vds = (I\_SENSE * K * R/M) + (I\_SENSE * R * K) \qquad (2)$$

And;

$$DELT\_V = R/K/(R/K + R/M) = M/(K+M) * Vds \qquad (3)$$

By substituting Vds from (1) into (3), the following is obtained:

$$I\_SENSE * R = I\_BOOST * (R/N * (M/(M+K))) \qquad (4)$$

Then, $$I\_SENSE = I\_BOOST/N * (M/(M+K)) \qquad (5)$$

Which results in a current scaling ratio of:

$$I\_SENSE/I\_BOOST = M/(N*(M+K)) = 1/N*(M/(M+K)) \qquad (6)$$

If the first power switch 506 is sized sufficiently larger than the first sense switch 508, M/(M+K) is approximately 1 resulting in:

$$\text{I\_SENSE}=\text{I\_BOOST}/N \qquad (7)$$

and $$\text{I\_SENSE}/\text{I\_BOOST}=1/N \qquad (8)$$

As a result, the I_SENSE current is a relatively constant fraction of the inductor current, I_BOOST, independent of process and/or temperature variations. It is appreciated that some error can be introduced by mismatch between the third sense switch 512 and the second power switch 507, particularly when the ration N is in the order of several hundreds or thousands. The converter of FIG. 5 is thusly able to generate a scaled down version of the inductor current substantially independent of process and/or temperature, unlike conventional DC-DC converters, such as shown in FIGS. 2 and 3, that employ a voltage that varies with process and temperature.

The voltage ramp generator 522 operates as a current source for the fourth sense switch 524 and generates a voltage based voltage ramp signal (VRAMP) as a function of the I_SENSE current. The operation of the voltage ramp generator 522 according to one example is further described with respect to FIG. 6. The PWM controller 502 then receives the VRAMP signal and adjusts its control of the driver 504 accordingly.

Figure 6:
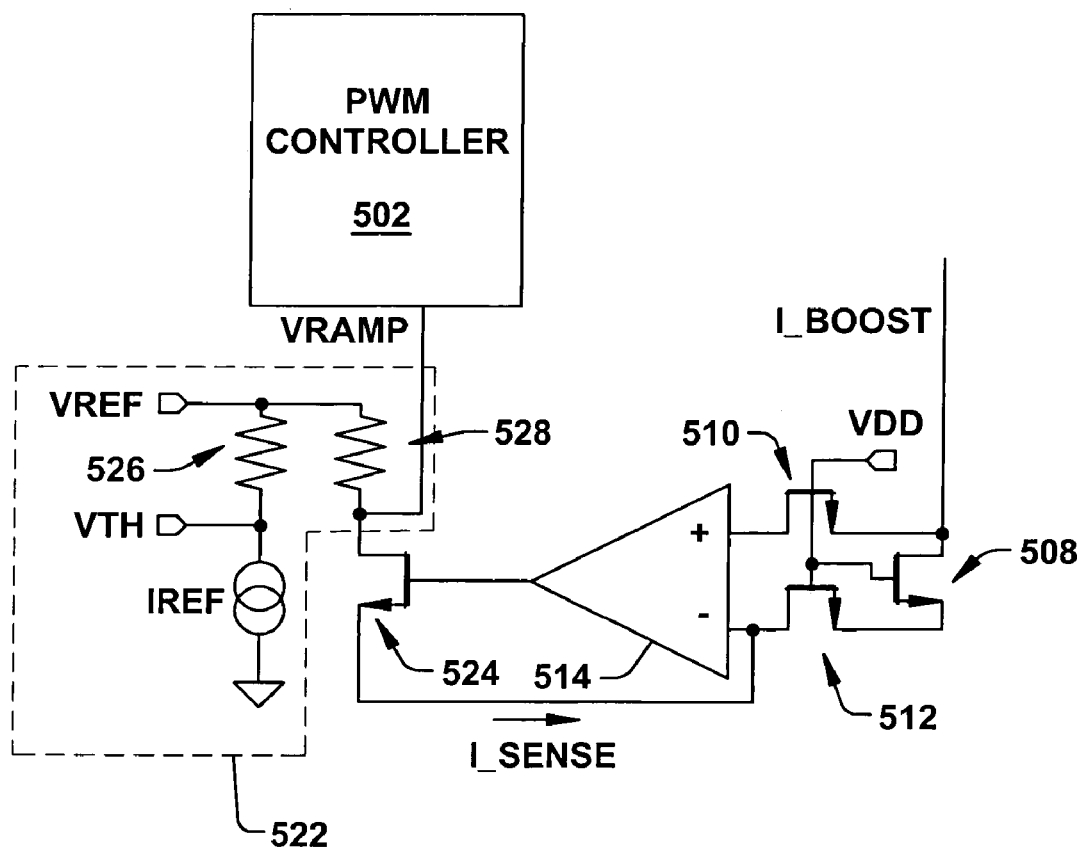
FIG. 6 is a schematic diagram illustrating a detailed portion of the converter of FIG. 5 in accordance with an aspect of the present invention is provided.

Turning now to FIG. 6, a schematic diagram illustrating a detailed portion of the converter of FIG. 5 in accordance with an aspect of the present invention is provided. FIG. 6 and the following description provide additional details of a suitable voltage ramp generator that can be employed with the converter of FIG. 5.

The voltage ramp generator 522 includes a first resistor 526 and a second resistor 528. A first terminal of the second resistor 528 is connected to a reference voltage (VREF) and a second terminal of the second resistor 528 is connected to the source of the fourth sense switch 524. During operation, I_SENSE flows through the second resistor 528 resulting in a voltage at its second terminal of VREF−(I_SENSE*R2), where R2 is the resistance of the second resistor 528. This voltage is provided as the VRAMP signal to the PWM controller 502. It is noted that the VRAMP signal is inverted from conventional VRAMP signals. The voltage ramp generator 522 can include an inverter that inverts the VRAMP signal or the PWM controller 502 can be configured to accept this inverted signal. It is noted that other variations of the voltage ramp generator 522 can comprise only the second resistor 528 and operate without other components.

Typically, the second resistor 528 is comprised of polysilicon and formed via a conventional CMOS process. As a result, the second resistor 528 typically has a smaller or much smaller temperature coefficient than metal resistors employed in conventional DC-DC converters (see, FIGS. 2 and 3).

The first resistor 526 facilitates limiting inductor current during operation of the converter. A first terminal of the first resistor 526 is also connected to the reference voltage (VREF) and a second terminal is connected to a threshold voltage (VTH). The threshold voltage (VTH) is at a value less than the reference voltage (VREF) due to a constant reference current (IREF) that is pulled through the first resistor 526, wherein the reference current (IREF) is equal to (VREF−VTH)/R1, where R1 is the resistance of the first resistor 526. As a consequence, if R1=R2, then the peak I_BOOST current is equal to IREF*N. Thus, selection of IREF can be employed to set a peak current limit for the inductor current.

Figure 7A:
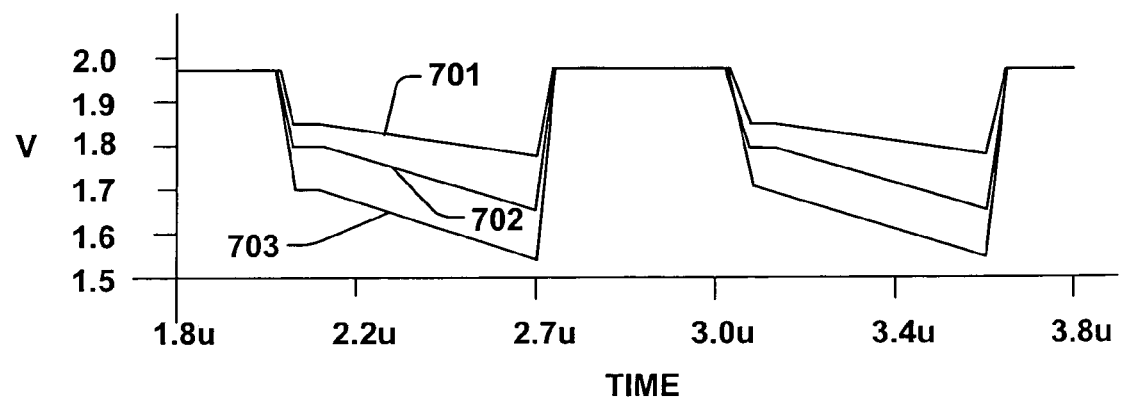
FIGS. 7A and 7B illustrate VRAMP voltage and IBOOST current values for a conventional current mode DC-DC converter.
Figure 7B:
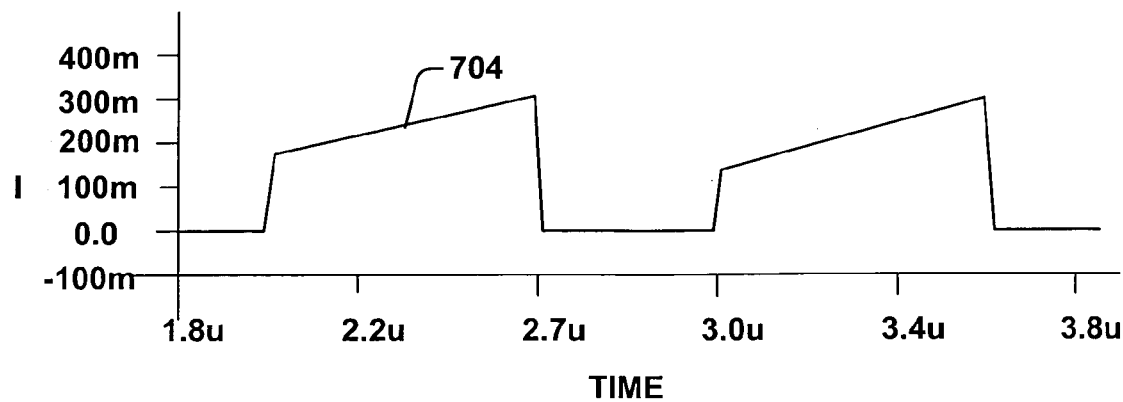

FIGS. 7A, 7B, 8A, and 8B, discussed below, illustrate operational simulations of a conventional current mode DC-DC converter and a current mode DC-DC converter of the present invention. For each converter, three simulations were performed at varied temperatures. FIGS. 7A and 7B illustrate VRAMP voltage and I_BOOST current values, respectively, for a conventional current mode DC-DC converter, such as the converter of FIG. 3. Values employed in the simulations for FIGS. 7A and 7B include setting the power switches (306 and 307) to always ON and the first resistor 308 to a 0.1 ohm metal resistor with a metal width of 120 um for electro-migration issues. FIG. 7A shows 3 simulations in which the temperature was varied. Line 701 is a simulation at low temperature where the resistance of the first resistor 308 is low, line 702 is a simulation at a normal temperature with a normal resistance, and line 703 is a simulation at a relatively high temperature with an increased resistance. Ideally, the change in temperature would have no effect. However, the conventional converter of FIG. 7A results in about 250 mili-volts in change for this simulation. FIG. 7B illustrates the inductor current (I_BOOST) which is about the same for each of the three simulations.

Figure 8A:
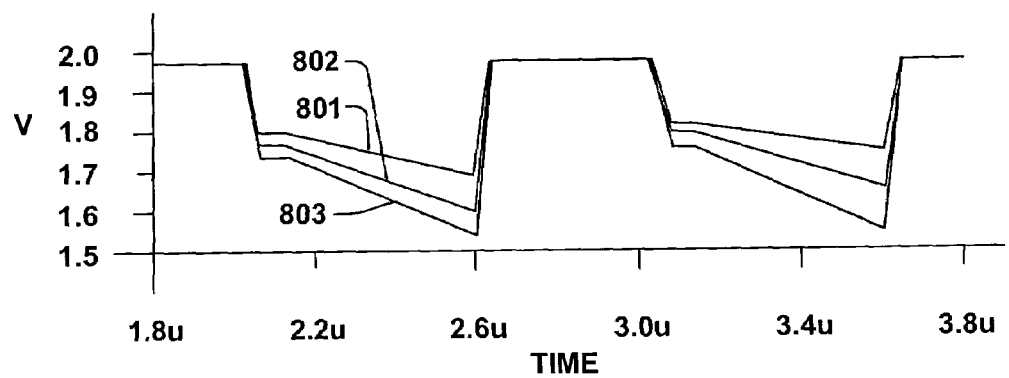
FIGS. 8A and 8B illustrate VRAMP voltage and IBOOST current values for a current mode DC-DC converter in accordance with an aspect of the present invention.
Figure 8B:
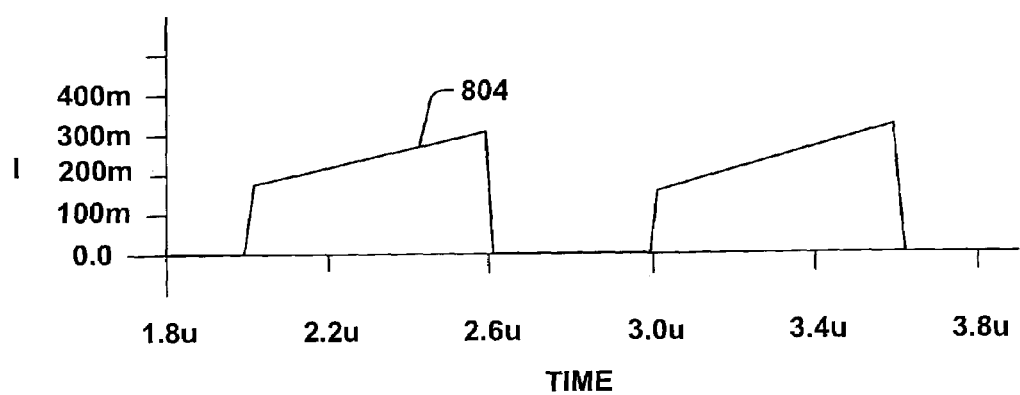

FIGS. 8A and 8B illustrate VRAMP voltage and I_BOOST current values, respectively, for a current mode DC-DC converter in accordance with an aspect of the present invention, such as the converter of FIG. 5. Values employed in the simulations for FIGS. 8A and 8B include setting the power switches (506 and 507) to always ON. Current (I_BOOST) to the second power switch 507 is scaled by transistor values for the first sense switch 508 and the third sense switch 512 to obtain I_SENSE, which is converted to a voltage by the first resistor 526. FIG. 8A shows 3 simulations in which the temperature was varied. Line 801 is a simulation at low temperature where the resistance of the first resistor 308 is low, line 802 is a simulation at a normal temperature with a normal resistance, and line 803 is a simulation at a relatively high temperature with an increased resistance. However, this converter results in about 120 milli-volts in change for this simulation, as opposed to the 250 milli-volts of the conventional converter. FIG. 8B illustrates the inductor current (I_BOOST), which is about the same for each of the three simulations.

In view of the foregoing structural and functional features described supra in FIGS. 1–8B, methodologies in accordance with various aspects of the present invention will be better appreciated with reference to the above figures. While, for purposes of simplicity of explanation, the methodology and variations thereof described below are depicted and described as executing serially, it is to be understood and appreciated that the present invention is not limited by the illustrated order, as some aspects could, in accordance with the present invention, occur in different orders and/or concurrently with other aspects from that depicted and described herein. Moreover, not all illustrated features may be required to implement a methodology in accordance with an aspect the present invention.

Figure 9:
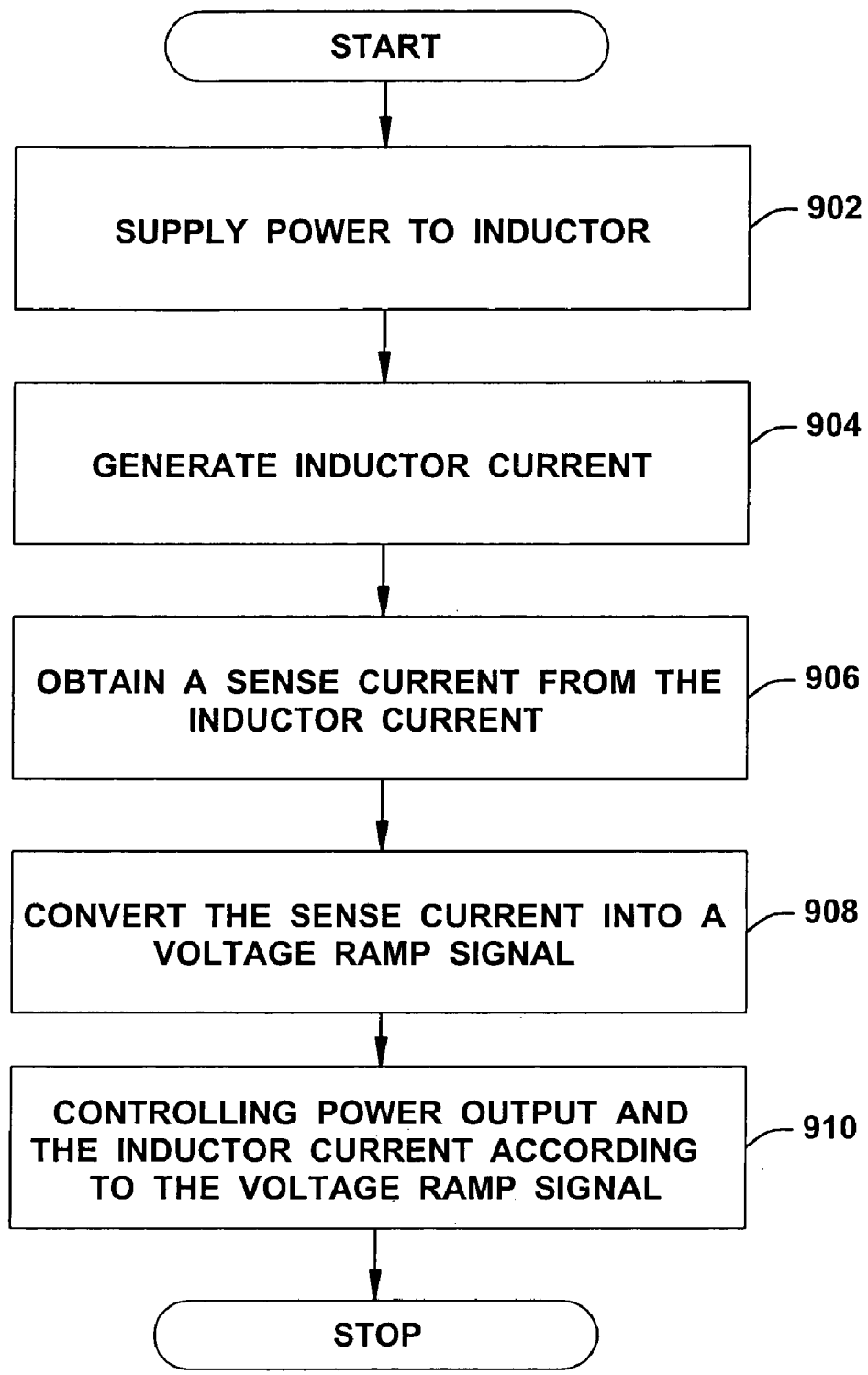
FIG. 9 is a flow diagram illustrating a method of operating a DC-DC converter in accordance with an aspect of the present invention.

FIG. 9 is a flow diagram illustrating a method of operating a DC-DC converter in accordance with an aspect of the present invention. The converter is a current mode DC-DC converter that employs an LC filter. The method mitigates power consumption and facilitates current and voltage output control of the converter by sensing inductor current without employing a resistor to obtain the sensed current.

The method begins at block 902, where a power source (e.g., a battery) is supplied to an inductor. Typically, a first terminal of the inductor is connected to VDD and a second terminal is connected to a power switch and a load via a diode. As a result of power being supplied to the inductor, inductor current is generated at block 904. Variations in the inductor current affect an output voltage supplied to the load. A down scaled version of the inductor current, referred to as sense current, is obtained at block 906. The sense current is obtained by using a number of power switches and sense switches that operate similar to a current mirror as is described supra with respect to FIG. 5. The sense current is substantially a constant fraction of the inductor current. A sense transistor/switch whose gate is connected to an output of a differential amplifier generates or supplies the sense current, which is fed back to an input of the differential amplifier. The amplifier causes the sense current to increase or decrease in order to equalize the voltage across its inputs.

The sense current is converted into a voltage ramp signal at block 908. Typically, a resistor connected to a reference voltage is connected to a source of the sense transistor above. The voltage drop across the resistor permits a voltage ramp signal to be obtained from the source of the sense transistor. The voltage ramp signal may, in some aspects of the invention, then be inverted. Additionally, in another alternate aspect of the invention, the inductor current is limited to a selected peak value.

A power controller operates power switches according to the voltage ramp signal to control the inductor current and provide an output voltage at block 910. There are typically two power switches, as described with respect to FIG. 5. The controller generally creates a control signal that drives the power switches to controllably supply power from the inductor. Typically, the power controller signals a driver component that drives gates of the power switches. The switches modify the inductor current and, therefore, the output voltage provided.

Although the invention has been shown and described with respect to a certain aspect or various aspects, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising."

What is claimed is:

1. A DC-DC converter for providing a selected output voltage comprising:
   a power controller that generates a control signal according to a voltage ramp signal;
   an inductor-based power stage that supplies power according to the control signal;
   a current scaler that obtains inductor current from the inductor-based power stage and generates a sense current, wherein the sense current is substantially a constant fraction of the inductor current;
   a voltage ramp generator that generates the voltage ramp signal according to the sense current;
   a switch circuit comprising switch transistors between a power source and the selected output voltage; wherein a current of the switch circuit is monitored by a sense switch;
   the sense switch comprising a sense transistor controlled by the power source and the sense transistor is an unit-element type of the switch transistors; and
   wherein the DC-DC converter is contained in a portable electronic device.

2. A DC-DC converter comprising:
   a power controller that generates a control signal according to a voltage ramp signal;
   an inductor-based power stage that supplies power according to the control signal;
   a current scaler that obtains inductor current from the inductor-based power stage and generates a sense current, wherein the sense current is substantially a constant fraction of the inductor current;
   a voltage ramp generator that generates the voltage ramp signal according to the sense current;
   wherein the inductor based power stage comprises:
      an inductor having a first terminal connected to a power sources;
      a first power switch having a gate that receives the control signal and a drain connected to a second terminal of the inductor;
      a second power switch having a gate that receives the control signal and a drain connected to the second terminal of the inductor; and
      a first sense switch having a gate connected to a positive power source and a drain connected to a source of the first power switch and a source connected to a source of the second power switch.

3. The converter of claim 2, wherein the inductor based power stage further comprises:
   a diode having a first terminal connected to the second terminal of the inductor and a second terminal that provides an output voltage; and
   a filter capacitor having a positive terminal connected to the second terminal of the diode and a negative terminal at ground.

4. A DC-DC converter comprising:
   a power controller that generates a control signal according to a voltage ramp signal;
   an inductor-based power stage that supplies power according to the control signal;
   a current scaler that obtains inductor current from the inductor-based power stage and generates a sense current, wherein the sense current is substantially a constant fraction of the inductor current;
   a voltage ramp generator that generates the voltage ramp signal according to the sense current;
   wherein the current scaler comprises:
      a first sense switch having a gate connected to a positive power source and a drain and a source that receives a portion of the inductor current;
      a second sense switch having a gate connected to the positive power source and a source connected to the drain of the first sense switch;
      a third sense switch having a gate connected to a the positive power source and a source connected to the source of the first sense switch;
      a differential amplifier having a positive input connected to the drain of the second sense switch and a negative input connected to a drain of the third sense switch; and
      a fourth sense switch having a gate connected to a differential output of the differential amplifier, a drain connected to the voltage ramp generator and a source connected to the negative input of the differential amplifier.

5. A DC-DC converter comprising:
   a power controller that generates a control signal according to a voltage ramp signal;

an inductor-based power stage that supplies power according to the control signal;

a current scaler that obtains inductor current from the inductor-based power stage and generates a sense current, wherein the sense current is substantially a constant fraction of the inductor current;

a voltage ramp generator that generates the voltage ramp signal according to the sense current;

wherein the voltage ramp generator comprises a first resistor that receives a reference voltage at a first terminal and has a second terminal connected to the current scaler and the power controller, wherein the second terminal operates as a current source for the sense current and supplies the voltage ramp signal to the power controller.

6. The converter of claim 5, wherein the voltage ramp generator further comprises a second resistor having a first terminal that receives the reference voltage and a second terminal connected to a reference current, wherein the reference current limits the sense current and the inductor current.

7. The converter of claim 5, wherein the voltage ramp generator further comprises an inverter connected to the second terminal of the first resistor that inverts the voltage ramp signal before being supplied to the power controller.

8. A DC-DC converter comprising:

a power controller that generates a control signal according to a voltage ramp signal;

an inductor based power stage that supplies power according to the control signal comprising:

an inductor having a first terminal connected to a power source a first power switch having a gate that receives the control signal and a drain connected a second terminal of the inductor;

a second power switch having a gate that receives the control signal and a drain connected to the second terminal of the inductor; and a first sense switch having a gate connected to a positive power source and a drain connected to a source of the first power switch and a source connected to a source of the second power switch and a negative power node;

a current scaler that obtains inductor current from the inductor based power stage and generates a sense current, wherein the sense current is substantially a constant fraction of the inductor current comprising:

a second sense switch having a gate connected to the positive power source and a source connected to the drain of the first sense switch;

a third sense switch having a gate connected to the positive power source and a source connected to the source of the first sense switch;

a differential amplifier having a positive input connected to a drain of the second sense switch and a negative input connected to a drain of the third sense switch; and a fourth sense switch having a gate connected to a differential output of the differential amplifier, and a source connected to the negative input of the differential amplifier; and a voltage ramp generator connected to a drain of the fourth sense switch that generates the voltage ramp signal according to the sense current.

9. The converter of claim 8, wherein the third sense switch is of unit size, the first sense switch is of K times unit size, the first power switch is M times unit size, and the second power switch is N times unit size.

10. The converter of claim 9, wherein the sense current is substantially equal to the inductor current divided by N times the quantity M divided by M plus K.

11. The converter of claim 9, wherein the sense current is substantially equal to the inductor current divided by N.

12. The converter of claim 8, wherein the sense current is a relatively constant fraction of the inductor current, wherein the relatively constant fraction is substantially related to a size of the second power switch and a size of the third sense switch.

13. The converter of claim 8, wherein a voltage drop across the third sense switch is due to the sense current passing through the third sense switch.

14. The converter of claim 13, wherein the voltage drop across the third sense switch is substantially equal to a voltage drop across the first sense switch.

15. The converter of claim 14, wherein the voltage drop across the first sense switch is relatively insensitive to temperature.

16. The converter of claim 8, wherein the inductor based power stage further comprises:

a diode having a first terminal connected to the second terminal of the inductor and a second terminal that provides an output voltage; and a filter capacitor having a positive terminal connected to the second terminal of the diode and a negative terminal at ground.

17. The converter of claim 8, wherein the differential amplifier modifies the sense current to equalize the voltage across the positive and negative inputs.

18. A method of operating an inductor based DC-DC converter comprising:

providing a power source to an inductor;

generating inductor current according to a voltage ramp signal;

obtaining a sense current that is a relatively constant fraction of the inductor current;

generating the voltage ramp signal from the obtained sense current, wherein the voltage ramp signal is representative of the inductor currents;

using two switch transistors in parallel to switch the power source to a selected output source and passing the inductor current through the switch transistors; and monitoring the sense current through a sense transistor.

19. The method of claim 18, further comprising limiting the inductor current to a peak value.

20. The method of claim 18, further comprising inverting the voltage ramp signal.

21. The method of claim 18, wherein obtaining the sense current comprises generating the sense current to equalize a voltage across a positive and negative input of a differential amplifier.

22. The converter of claim 2, wherein the converter is contained in a portable electronic device.

23. The converter of claim 8, wherein the converter is contained in a portable electronic device.

* * * * *